United States Patent [19]

Meier et al.

[11] 3,937,424

[45] Feb. 10, 1976

[54] ELECTRICALLY POWERED AIRCRAFT

[75] Inventors: Hans Justus Meier; Herbert Sadowski, both of Bremen; Ulrich Stampa, Bremen-Schonebeck, all of Germany

[73] Assignee: Vereinigte Flugtechnische Werke-Fokker GmbH, Bremen, Germany

[22] Filed: Nov. 1, 1974

[21] Appl. No.: 520,159

[30] Foreign Application Priority Data
Nov. 16, 1973 Germany............................ 2357286

[52] U.S. Cl..................... 244/53 R; 46/78; 136/6 R
[51] Int. Cl.²......................................... B64D 27/02
[58] Field of Search............ 244/53 R, 53 A, 54, 58, 244/62, 63; 46/243 AV, 243 MV, 74 R, 76 R, 78; 136/6 R, 166, 181; 105/50

[56] References Cited
UNITED STATES PATENTS

| 310,724 | 1/1885 | Rogers................................... 105/50 |
| 2,368,630 | 2/1945 | Bizjak.................................... 244/58 |
| 3,160,528 | 12/1964 | Dengler et al....................... 136/181 |
| 3,391,752 | 7/1968 | Albright............................... 136/6 R |
| 3,696,558 | 10/1972 | Mabuchi et al................. 46/243 AV |
| 3,852,110 | 12/1974 | Dickfeldt............................ 136/6 R |

*Primary Examiner*—Trygve M. Blix
*Assistant Examiner*—Galen L. Barefoot
*Attorney, Agent, or Firm*—Ralf H. Siegemund

[57] ABSTRACT

The wings of an electromotorically drive aircraft have span wise extending central wing cases whose interior serves as battery cells. Load bearing transverse walls take up bending stresses reacted into such walls by tops and bottoms of such central wing case. These tops and bottoms may constitute the electrodes of the battery. Leading and trailing edge-profile completing wing cases are secured, possibly releasibly secured, to the transverse walls of the central wing case.

13 Claims, 5 Drawing Figures

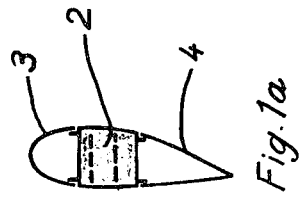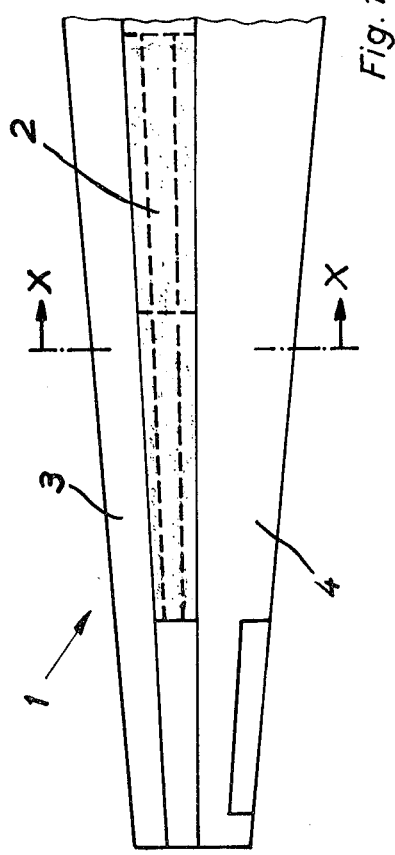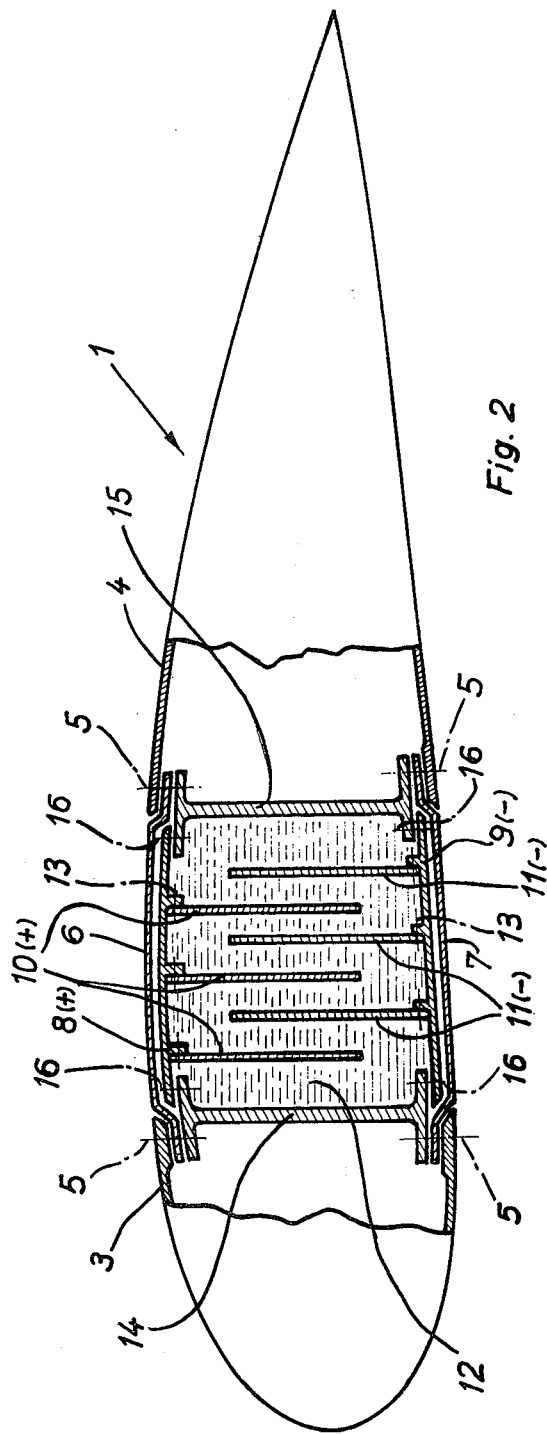

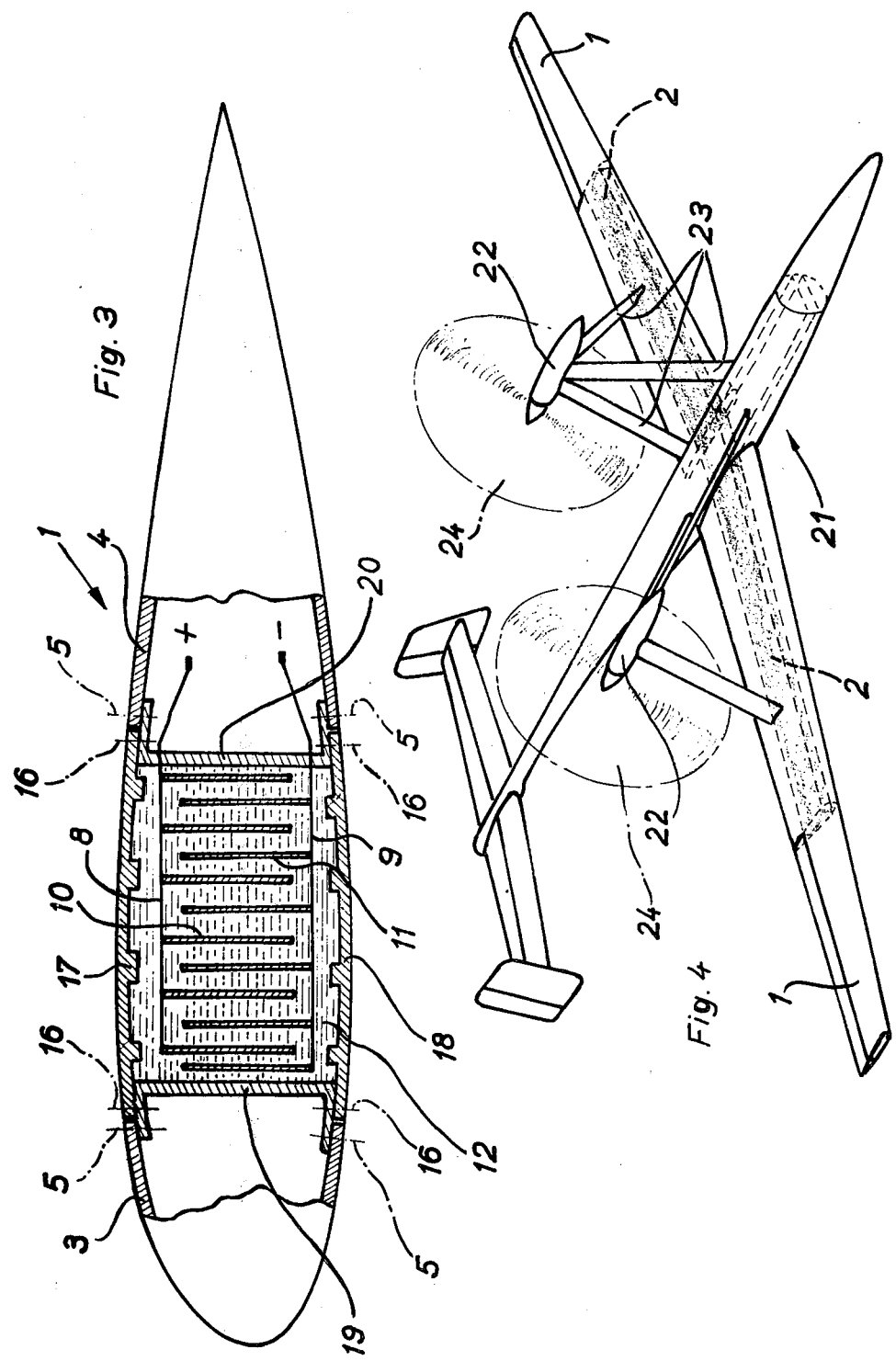

ELECTRICALLY POWERED AIRCRAFT

BACKGROUND OF THE INVENTION

The present invention relates to improvements in electrically powered aircraft, propelled by electromotorically driven propellers or the like.

The use of electric motors for driving the propellors of an aircraft poses the problem of a very unfavorable weight to power ratio, because the weight of the batteries or fuel cells generating the necessary electrical energy is very high, particularly when compared with other fuel for the same propulsion power.

Known accumulators e.g. with lead electrodes are very heavy which is a significant drawback for use in aircraft. However, one must consider that in some instances electric motor propulsion is better than conventional engines. For example, unmanned military patrol aircraft may well be equipped with electric motor. Such a craft is designed for low speeds and has high aspect ratio wings.

DESCRIPTION OF THE INVENTION

It is an object of the present invention to reduce the weight of the power source in electrically powered aircraft, and to particularly improve the power output to weight ratio of such an aircraft so that pay load can be increased and its economy will improve accordingly.

In accordance with the preferred embodiment of the present invention, it is suggested to construct a central portion of each wing as self-supporting, aerodynamic load bearing wing case whose interior serves as battery or fuel cell. Such a case has transverse walls extending in the direction of the respective wing span and over the entire height of the wing at that location. Profiled tops and bottoms following the stream/lined wing profile, as designed for producing aerodynamic lift, cover and seal that central wing case. This is particularly important if this central wing case is filled with rather corrosive electrolytic liquid. Tops and bottoms are connected to the respective transverse walls so that forces can be transferred and the central wing case acts as a spar.

The top and bottom of a central wing case may constitute themselves the two different electrodes in which instance they are covered with an electrically insulating skin. Alternatively, the electrodes are separately introduced in which instance tops and bottoms are made of electrically insulating material. The transverse walls are made of insulating material in either case.

The transverse walls have either double T or U shaped configuration, and leading and trailing edge defining wing cases are secured thereto, to establish the wing profile, together with the respective top and bottom of a central wing case. If those additional cases are removable, the transverse walls of the central case will be exposed e.g. for cooling during battery re-charge.

It can thus be seen, that the construction parts of the batteries constitute load bearing construction parts of the aircraft and as such do not subtract from the pay load. This is particularly an improvement over aircraft with batteries in the fuselage, and without incorporation in the load bearing structure.

The advantage of the invention is particularly prevalent for aircraft with high aspect ratio wings. The stress on the wing is actually reduced, particularly as set up by bending strain and transverse forces, because of the added and distributed weight of the electrolytic liquid. The fuselage is now available for more pay load.

DESCRIPTION OF THE INVENTION

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically an aircraft wing with view into its interior;

FIG. 1a is a cross-section taken along line xx of FIG. 1;

FIG. 2 is in the essence an enlargement of the view of FIG. 1a;

FIG. 3 is a modification of the view of FIG. 2; and

FIG. 4 is a perspective view of an electromotorically driven aircraft.

Turning now to the detailed description of the drawings, reference is made first to FIG. 4 showing an aircraft 21 with wings 1 containing electrical storage cells 2. The aircraft has two engines constructed as electric motors 22 for driving propellers 24. The motors 22 are mounted on top of the wings by means of struts 23. Mounting the motors in that fashion provides some load relief for the wings and reduces engine noise.

The hatched zone in the wings is occupied by the electrical energy sources 2, whereby the dotted lines denote transverse walls inside of the wing case. This energy source in each wing is basically a closed case constituting directly a portion of the wing case, and can be termed a central wing case as to each wing.

Profiled cases 3 and 4 are attached to the central wing case to complete a wing profile. One can also say that the electrical energy source 2 in a wing constitutes a load bearing spar construction. Aerodynamic forces are transmitted from the profile cases 3 and 4, to the case 2 via the connecting joints 5, as shown in FIG. 2.

Turning now to further details of FIG. 2, the electrical energy casing is constructed from double T bars or spars 14 and 15 which serve as transverse walls of the central wing case. These walls 14, 15 constitute load bearing parts of the wing structure. They are made of electrically nonconducting material and transverse forces and bending moments are reacted into these elements 14, 15 as they arise.

Walls extending parallel to the vertical plane of symmetry of the aircraft may additionally be provided and constitute part of the rib structure. Such walls partition the casing into individual cells.

Each central wing case has a top and a bottom constructed in this instance as electrodes 8 and 9. These electrodes have inwardly and span wise extending ribs, and they are secured to the cross bars of the respective T's of each spar 14, 15. The interconnection is made through bolting and riveting and must be fluid tight, for sealing the interior of these resulting central wing case.

The electrodes 8 and 9 extend in the longitudinal extension of the wings. Anode plates 10 are secured to electrodes 8 and cathode plates 11 are secured to electrodes 9. The points of connection are denoted by numeral 13 and refer to positive connectors so that they can take up any mechanical tension inserted upon the covers 8 and 9. This way, anode and cathode plates serve as stiffening elements for ribbed top 8 and bottom 9 of each wing case.

The space between the electrodes, i.e., the interior of the central wing case is filled with electrolytic liquid 12. The electrical connectors are not shown, they lead from anodes and cathode via cable to the motors 22.

One can construct these batteries as regular lead batteries or as nickel-cadmium batteries. The electrolytic liquid may be sulfuric acid or potash lye. Either liquid is quite corrosive so that the joints 16 must be constructed for tight sealing.

The electrodes 8 and 9 are covered with insulation, 6 and 7 respectively, constituting part of the skin of the wing and being flush with the contour of front and all wing casings 3, 4. The electrodes 8, 9 do not cover the wing case continuously along the span of the wing, if the battery is divided into cells by ribs which run parallel to the vertical plane of symmetry of the craft. The electrodes 8, 9 are divided (electrically) accordingly, but mechanically interconnected along the span of the wing.

The leading and trailing edge defining, profiled wing cases 3 and 4 are respectively connected (bolted or riveted) to the flanges or cross bars of carrier bars and spars 14, 15 at the locations 5. Alternatively, one could provide here for releasable, fold back connections so that the cases 3 and 4 can be readily removed for full access to central casing - battery 2. Such access is desirable when the battery is recharged with a high current and must be cooled. Folding back or otherwise removing at least one of the cases 3 and 4 exposes the respective transverse wall of the central case of a wing and permits ready heat exchange to a coolant to remove heat developed by ohmic losses in the battery when recharged.

The wing cases 3 and 4 are constructed from metal or nonmetallic material as required for the aircraft, which is independent from the use of the central wing portion as battery. As can be seen in FIG. 2, the insulating skin 6 and 7 is interposed between the connection to spars 14, 15, particularly for separating cases 3 and 4 from electrode plates as also connected to transverse walls and spars 14, 15.

FIG. 3 shows a modification, wherein only the casing for the battery is constructed as wing case without inclusion of the electrodes in the supporting structure. The central wing case has two U-shaped profiles serving as spar elements and top and bottom of the central wing case is provided for by means of plates 17, 18 with inwardly extending stiffening ribs.

These four elements 17, 18, 19, 20 are interconnected at 16 by means of rivets, bolts or the like to establish a closed and liquid tight sealed case. Specifically, top 17 and bottom 18 of the central wing case are connected to the legs of the U of the two transverse spars 19, 20, whereby the bottom of the U in each instance constitutes the transverse wall proper.

These elements 17 through 20 are preferably made of glass fiber reinforced plastic. Wing cases 3 and 4 are then made of the same material. When made from such or similar material, the craft can hardly be detected by radar. The connection of cases 3 and 4 to the central case is made to the leg portions of the U of the profiles 19, 20.

The wing will additionally include load bearing walls which extend parallel to the vertical plane of symmetry of the craft. These walls provide additional stiffening to the wing.

The electrodes 10 and 11 are not connected to the casing in a manner that aerodynamic forces are taken up or reacted into them. Rather, the electrode system as such is separated from the load bearing battery case 17, 18, 19, 20.

Turning back for the moment to FIG. 2, one can readily see that the central casing as such can readily be continued to the wing tip; it is, however, not advisable to fill far out portions of the wing with liquid as the lever arm action would be very high.

The invention is not limited to the embodiments described above but all changes and modifications thereof not constituting departures from the spirit and scope of the invention are intended to be included.

We claim:

1. An electrically powered aircraft having wings and fuselage and at least one electric motor for driving a propeller or the like for obtaining propulsion for the craft and having battery means as an electrical power source, the improvement comprising, of load bearing central wing cases for each wing, having transverse walls extending over the entire height of a wing in each instance and spaced apart in the direction of flight, each case further having profiled top and bottom plates secured to the transverse walls in liquid tight sealing manner, and for reaction and transfer of forces between the top and bottom plates, and the walls of the respective case;

electrode plates in said central wing case which is filled with electrolytic liquid to draw electric power therefrom; and leading and trailing edge defining wing cases respectively secured to said transverse walls to complete a wing profile together with outer surfaces of the top and bottom plates.

2. An aircraft as in claim 1, said top and bottom plates constituting two different electrodes from which electrode plates extend in a vertical direction, the top and bottom plates being covered with insulating sheeting.

3. An aircraft as in claim 1, said top and bottom plates and said transverse walls being made of electrically insulated materials.

4. An aircraft as in claim 1, said transverse walls being double T bars, the said edge defining cases and said top and bottom plates being respectively connected to cross bar parts of the T's.

5. An aircraft as in claim 1, said transverse walls being of U shaped profile, wherein the bottom of a U defines the respective transverse wall and the legs of a U have one of the top plate and one of the bottom plate as well as the edge defining cases connected thereto, one of the latter cases per U shaped profile.

6. An aircraft as in claim 1, wherein at least one of said edge defining cases is removable for exposure of the respective transverse wall to obtain enhanced cooling of the central cases during recharge of the battery.

7. An electrically powered aircraft having wings and fuselage and at least one electric motor for driving a propeller or the like for obtaining propulsion for the craft and having battery means as an electrical power source, the improvement comprising of load bearing central wing cases as parts of the wings being constructed as battery cells, each wing case having transverse walls extending over the entire height of a wing in each instance and spaced apart in the direction of flight, each case further having top and bottom plates secured to the transverse walls in liquid tight sealing manner and for reaction and transfer of forces between the top and bottom plates, and the walls of the respective case;

electrode plates in said central wing case which is filled with electrolytic liquid to draw electric power therefrom; and leading and trailing edge defining wing cases respectively secured to said transverse walls to complete a wing profile together with outer surface structure of the tops and bottoms.

8. An electrically powered aircraft as in claim 7, wherein the said wing cases have walls which form the spar of the aircraft to which the leading and trailing edge defining cases for the wings are secured.

9. An electrically powered aircraft as in claim 7, wherein said central wing cases each have top and bottom plates following and defining the overall wing contour together with said edge defining cases and being constructed as electrodes.

10. An electrically powered aircraft as in claim 7, said top and bottom plates being covered with an electrically insulating skin, continuing the contour and profile of the edge defining cases.

11. An electrically powered aircraft as in claim 7, wherein plates are secured to the electrodes for extension into the interior of the central casing and constituting stiffening for the electrodes.

12. An electrically powered aircraft as in claim 9, said walls constructed as electrically nonconducting double T bars.

13. An electrically powered aircraft as in claim 8, said walls constructed as electrically nonconductive U profiled bars, with electrically nonconductive top and bottom plates connected thereto for completing the central cases, as self-supporting cases which are liquid tight sealed constitute load bearing constructions, said edge defining cases being secured to the legs of the respective bars.

* * * * *